United States Patent [19]

Cotter

[11] Patent Number: 5,020,570
[45] Date of Patent: Jun. 4, 1991

[54] COMBINED VALVE MODULAR CONTROL PANEL

[75] Inventor: Jonathan P. Cotter, Dearborn, Mich.

[73] Assignee: Power Components, Inc., Redford, Mich.

[21] Appl. No.: 569,409

[22] Filed: Aug. 17, 1990

[51] Int. Cl.⁵ .............................................. F16K 11/10
[52] U.S. Cl. ................................ 137/596.12; 137/377; 137/884; 91/444
[58] Field of Search .................... 137/596.12, 625.27, 137/625.69, 884, 377; 91/444, 450

[56] References Cited

U.S. PATENT DOCUMENTS

| | | | |
|---|---|---|---|
| 3,556,147 | 1/1971 | Sizer | 137/884 |
| 4,524,807 | 6/1985 | Taliusis | 137/884 |
| 4,570,672 | 2/1986 | Wilke | 91/444 X |
| 4,848,405 | 7/1989 | Albrecht | 137/884 |

*Primary Examiner*—John C. Fox
*Attorney, Agent, or Firm*—Barnes, Kisselle, Raisch, Choate, Whittemore & Hulbert

[57] ABSTRACT

A valve modular control panel having a gas supply module at one end of a row of valve modules and a bleed module at the other end. Each valve module is individually controlled by its own valve mechanism. Gas under pressure is suppled to all of the valve modules from an inlet in the supply module by a passage running through all of the valve modules and terminating in the bleed module. A bleed passage runs through the valve modules and into the bleed module. All valve modules are bled through the bleed module. The bleed module is also capable of exhausting the supply passage. The panel can be expanded or contracted to include any number of valve modules which are releasably secured together by a series of nuts and tie rods. A protective shield for the panel can be adjusted in size depending on the number of modules in the panel.

15 Claims, 3 Drawing Sheets

COMBINED VALVE MODULAR CONTROL PANEL

This invention relates generally to fluid controls and more particularly to a combined valve modular control panel.

BACKGROUND

Conventional valve modular control panels have a plurality of individual valve modules to deliver high pressure gas to devices such as nitrogen gas springs often used in stamping operations to yieldably hold a clamping ring of a die assembly. One such modular control panel is disclosed in U.S. Pat. No. 4,838,527. The modules in these conventional control panels usually require two separate valves, generally operate independently of one another and without a master gas pressure inlet or master bleed control and without the capability of readily increasing or reducing the number of valve modules in the panel.

SUMMARY

The valve modular control panel of this invention combines one or more individual valve modules with a gas supply module and a bleed module in an integrated system for the metered distribution, monitoring and exhausting of high pressure gas. Each valve module is individually controlled preferably by a single valve mechanism. The supply module supplies gas to all of the valve modules in the panel. All of the valve modules are bled through the bleed module. The panel can be expanded or contracted to include any number of valve modules. The modules are clamped together preferably by a series of nuts and tie rods, the number of which is determined by the number of modules in the panel. A protective shield is also provided for the panel which can be adjusted in size depending upon the number of modules in the panel.

Objects, features and advantages of this invention are to provide a combined valve modular control panel in which each valve module is individually controlled, which has a supply module for supplying high pressure gas to all of the valve modules in the panel, which has a bleed module for bleeding all of the valve modules, which can be expanded or contracted to include any number of valve modules, which has an adjustable protective shield to protect the valve modules and their gages from damage, which is adjustably clamped together by a unique series of nuts and tie rods designed to accommodate whatever number of modules may be desired, and is rugged, durable, reliable, of simplified design and of relatively economical manufacture and assembly.

BRIEF DESCRIPTION OF THE DRAWINGS

These and other objects, features and advantages of the invention will be apparent from the following detailed description, appended claims and accompanying drawings in which:

DETAILED DESCRIPTION

Figure 1:
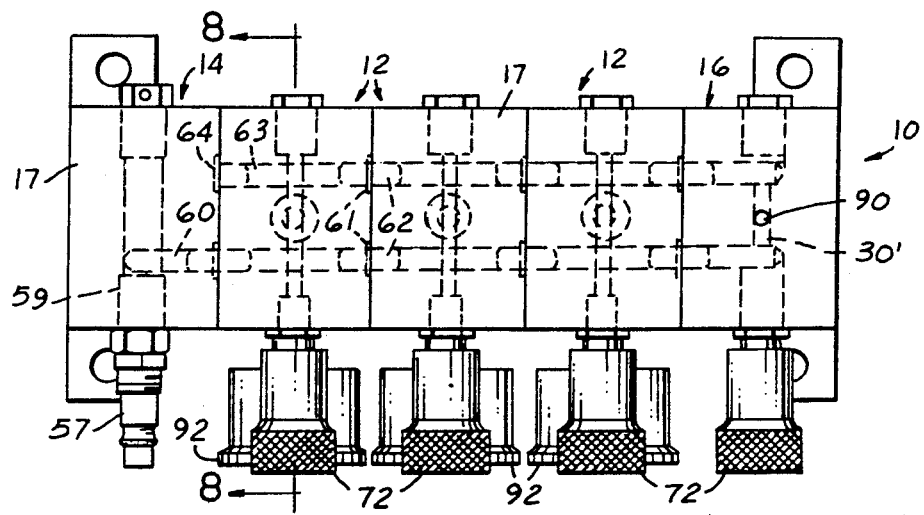
FIG. 1 is a top view of a combined valve modular control panel constructed in accordance with the invention, but omitting a protective shield.
Figure 2:
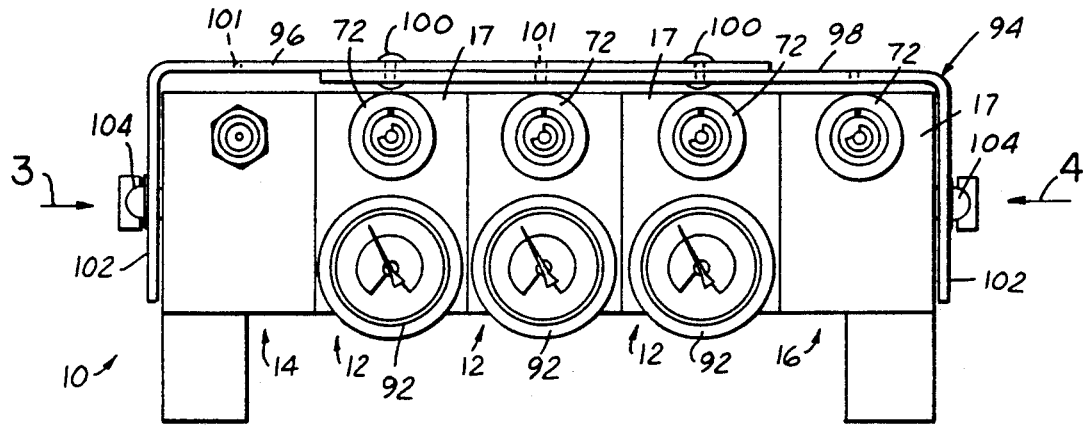
FIG. 2 is an elevational view of the combined valve modular control panel shown in FIG. 1 with a protective shield.

Referring now more particularly to the drawings, there is shown a combined modular control panel 10 having a plurality of valve modules 12, a supply module 14 and a bleed module 16. These modules 12, 14 and 16 have generally rectangular bodies 17 in end-to-end abutting relation with adjacent flat surfaces in flush surface-to-surface contact.

Figure 5:
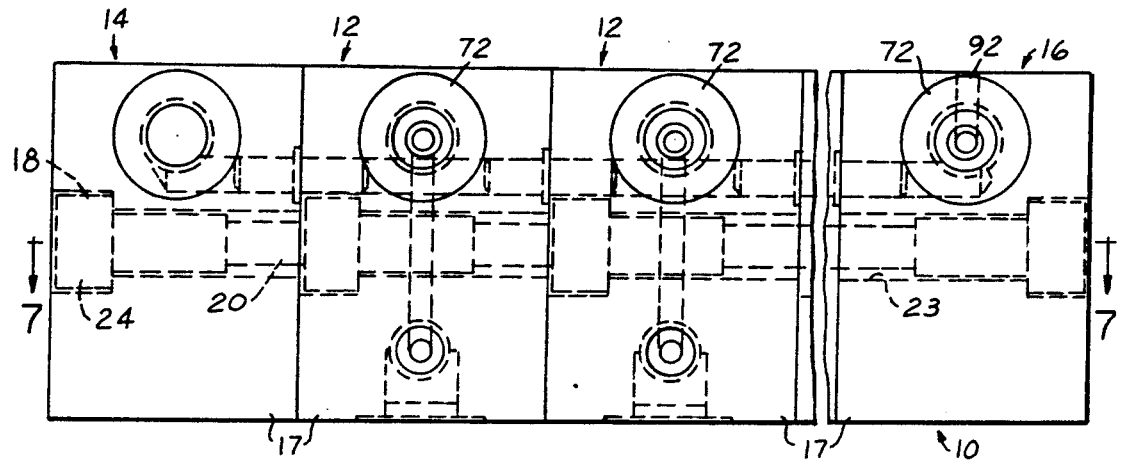
FIG. 5 is a side view taken generally on the line 5—5 in FIG. 3.
Figure 7:
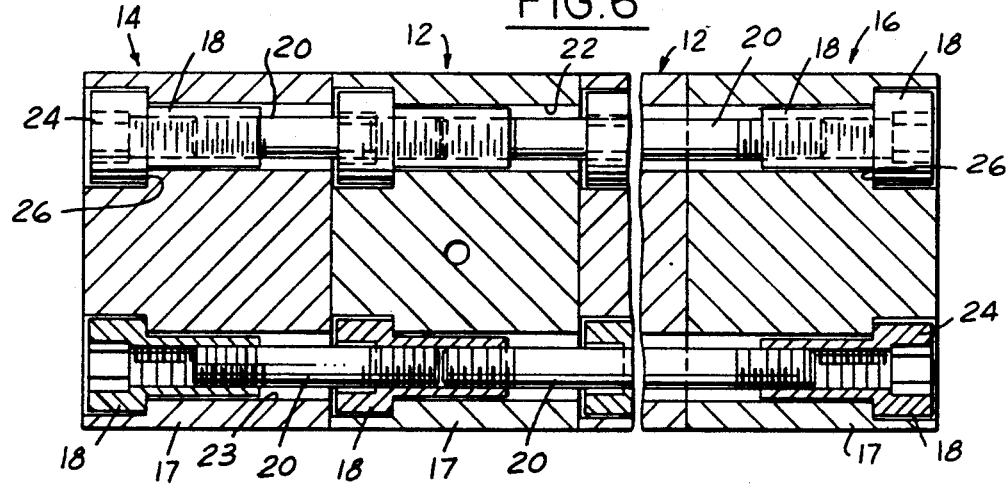
FIG. 7 is a fragmentary sectional view taken on the line 7—7 in FIG. 5.

The modules 12, 14 and 16 are releasably secured together by nuts 18 and tie rods 20 (See FIGS. 5 and 7). Each module has a pair of parallel holes 22 and 23 passing from end-to-end therethrough with a counterbore at one end. The holes 22 of the modules are aligned with each other, as are the holes 23. The nuts 18 are disposed in each hole 22 and 23 of each module with their heads 24 seated against shoulders 26 at the bottom of the counterbores. The counterbores in the holes 22 and 23 of modules 12 and 14 are at the same end of the holes. The counterbores in the holes of module 16 are at the opposite end of the holes. A tie rod 20 extends between adjacent modules and threads into the nuts in the holes in its adjacent modules. Although three valve modules 12 are shown, it is clear that valve modules may be added to the panel and secured into the assembly by providing them with nuts and tie rods similar to the nuts 18 and tie rods 20 already described. Valve modules also may be removed from the assembly.

Figure 8:
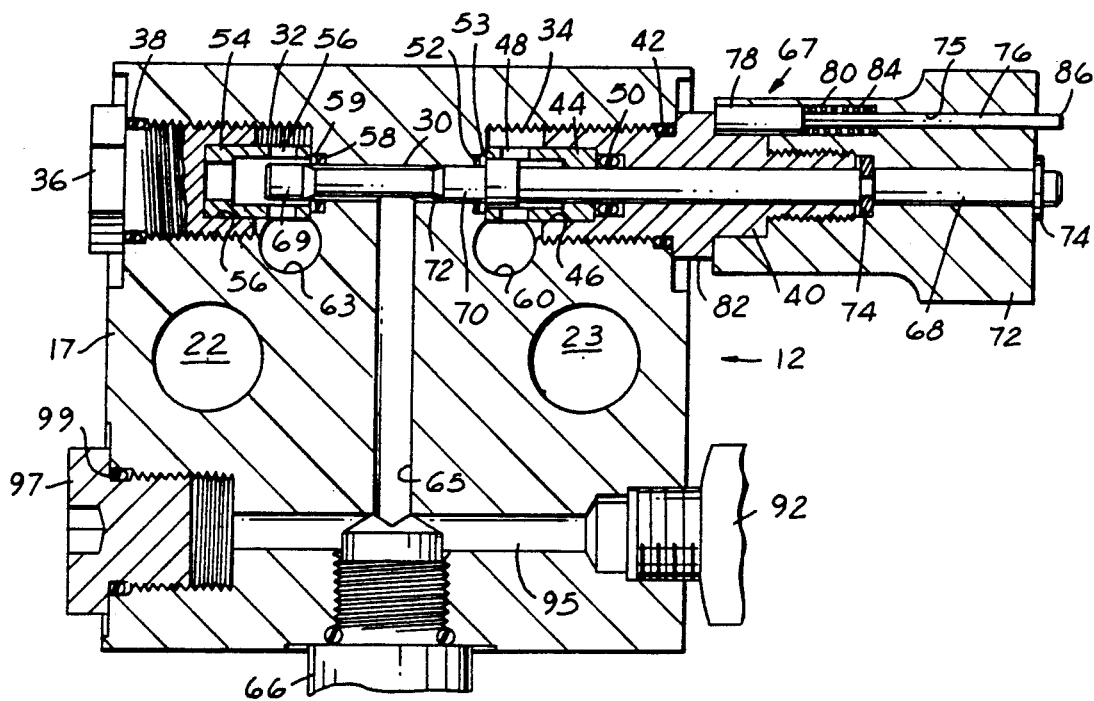
FIG. 8 is a sectional view of one of the valve modules, taken on the line 8—8 in FIG. 1.
Figure 9:
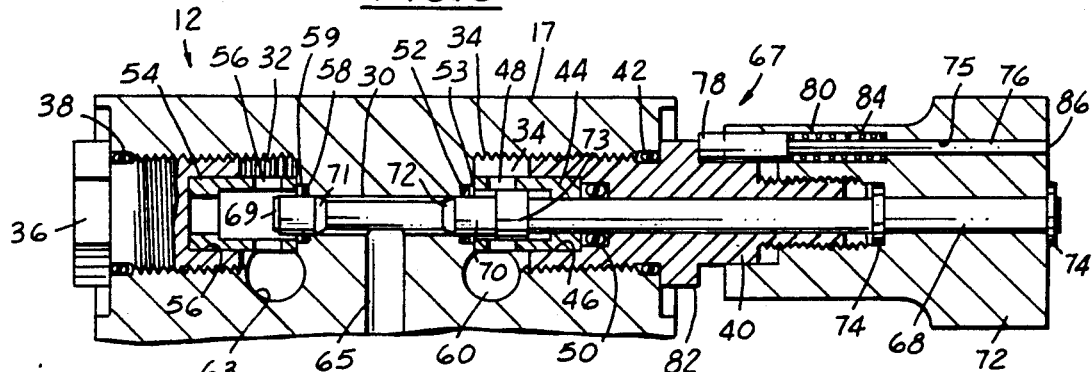
FIG. 9 and 10 are fragmentary sectional views similar to FIG. 8 but showing the parts of the valve assembly in different positions.
Figure 10:
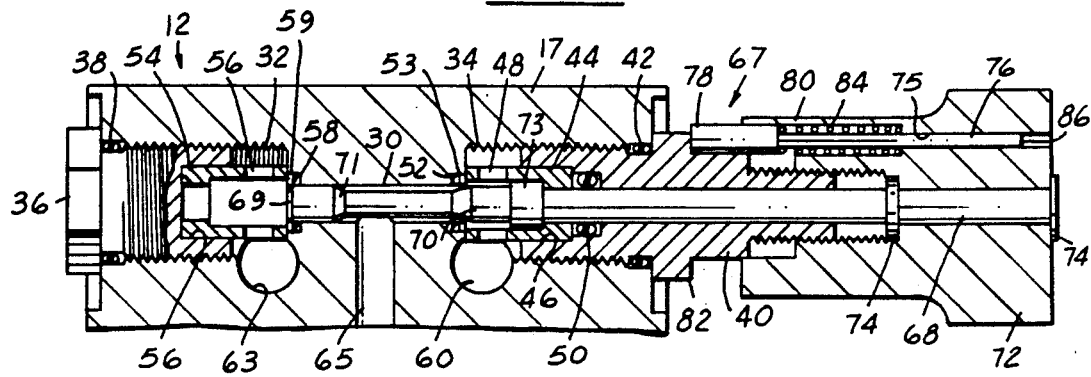

Referring to FIGS. 8-10, each valve module has a through bore from front to back to provide a central valve chamber 30, and counterbores 32 and 34 at each end of the valve chamber. Counterbore 32 is sealed by a plug 36 threaded therein, and an O-ring 38. A tubular valve rod guide 40 threads into the counterbore 34 and has a O-ring 42 to seal the counterbore.

A cup 44 is seated in a recess 46 in the inner end of the valve rod guide 40. Ports 48 are formed in the side wall of the cup. An O-ring 50 is disposed in a reduced extension at the base of recess 46. An annular seal 52 and retainer 53 surround one end of valve chamber 30 and are pressed into a recess at the base of the counterbore 34.

A cup 54 is seated in a recess 56 in the inner end of plug 36. Ports 56 are formed in the side wall of cup 54. An annular seal 58 and a retainer washer 59 surround the opposite end of valve chamber 30 and are pressed into a recess at the base of the counterbore 32.

Figure 6:
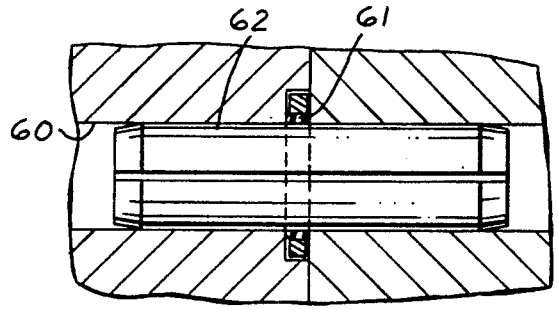
FIG. 6 is an enlarged sectional detail of a portion of FIG. 5.

A supply passage 60 runs through all three valve modules 12, terminating at one end in supply module 14 and at the other end in bleed module 16. As shown in FIGS. 1 and 6, the supply passage is sealed at the interface between modules by O-rings 61, each O-ring surrounding a split pin 62 in the passage extending across each interface to align adjacent modules. The supply passage communicates with the interior of cup 44 in each valve module through ports 48. High pressure gas is delivered to the supply passage 60 from a fitting 57 through a passage 59 in supply module 14. Preferably fitting 57 is a male quick disconnect with a one way check valve which prevents discharge of gas when the supply conduit is disconnected.

A bleed passage 63 runs through all three valve modules 12 and terminates in bleed module 16. The bleed passage is closed at one end by a seal 64 carried by supply module 14 and is sealed at the interface between modules by O-rings 61, each O-ring surrounding a split 62 pin in the passage extending across each interface to align adjacent modules. The bleed passage communicates with the interior of cup 54 in each valve module through ports 56.

Each valve body also has a passage 65 leading from the valve chamber 30 to a hose fitting 66 for delivering fluid under pressure, as for example nitrogen gas to a gas spring used in a stamping operation.

Each valve module 12 has a valve mechanism 67, with a valve rod 68 which slides axially in valve rod guide 40. Valve rod 68 extends through a hole in the base of cup 44 and through valve chamber 30. The O-ring 50 seals against the valve rod 68. Valve rod 68 has spools 69 and 70 which are axially spaced apart a distance less than the distance between the annular seals 52 and 58 at opposite ends of the valve chamber 30. The spools 69 and 70 are of substantially the same diameter as the valve chamber 30 and slide within the valve chamber. The spools 69 and 70 have tapered inner ends 71 and 72 for precise metering of gas flow through the valve chamber. The section of the valve rod between the spools 69 and 70 is smaller in diameter than the spools to provide a passage between them through the chamber 30.

In the FIG. 9 position of the valve rod 68, the spools 69 and 70 engage the seals 58 and 52, to seal the valve chamber 30 from the cups 44 and 54 and from the supply passage 60 and bleed passage 63. In the FIG. 8 position of the valve rod, the spool 69 moves into the cup 54 and out of engagement with seal 58, while spool 70 remains in sealing engagement with seal 52. Thus the valve chamber 30 is open to the bleed passage 63 but communication with the supply passage 60 is closed. In the FIG. 10 position, the spool 69 sealingly engages seal 58 while spool 70 moves out of engagement with seal 52 and into cup 44. In this position, the valve chamber 30 is open to the supply passage 60 but communication with the bleed passage 63 is closed. The valve rod 68 has an enlarged abutment 73 which provides a positive stop limiting longitudinal movement of the valve rod by contact with the bottom of counterbore 34 in the FIG. 8 position and contact with the bottom of cup 44 in the FIG. 10 position.

An external knob or handle 72 is threaded on the valve rod guide 40. The valve rod 68 extends through a center hole in the handle and is connected to the handle by C-rings 74 received in grooves in the rod which permit relative rotation between the handle and the valve rod but constrain them to move axially as a unit. The handle has an axially extending bore 75 offset from its axis of rotation for axially slidably receiving an elongated indicator pin 76. The pin has an enlarged head 78 slidable in a counterbore 80 and adapted to project through the inner end of the knob for engagement with an annular collar 82 on the valve rod guide 40. The pin is urged in an inward direction by a compression coil spring 84 to maintain the head of the pin in sliding contact with the collar.

The end 86 of the pin indicates the position of the valve rod 68 and hence the mode of operation of the valve i.e. bleed, closed or fill. Referring again to FIG. 8-10, it will be noted that in the FIG. 8 bleed position of the valve rod, the end 86 of the pin projects beyond the outer end of the handle. In the FIG. 9 closed position, the end of the pin in flush with the outer end of the handle. In the FIG. 10 fill position, the end of the pin is entirely inside the handle, spaced inwardly of the outer end thereof.

A bleed outlet 90 in the bleed module 16 is open to the atmosphere and communicates with a valve chamber 30' in bleed module 16. Valve chamber 30' in bleed module 16 is controlled by a valve mechanism which is identical to the valve mechanism for valve modules 12. FIGS. 9 and 10, which are sections showing the valve mechanism 67 for the valve modules 12, are also illustrative of the valve mechanism for bleed module 16, and differ only in that the bleed module 16 has a bleed outlet 90 (see FIG. 4) instead of the passage 65. The valve mechanism for bleed module 16 is operable in one position to seal the valve chamber 30' from both the supply passage 60 and the bleed passage 63. In a second position, the valve mechanism will open communication between the valve chamber 30' and the supply passage while cutting off communication to the bleed passage. This enables the supply passage 60 to be exhausted, insuring that all gas in the panel is vented before a module is added or removed. In a third position, communication between the valve chamber 30' and the bleed passage 90 is opened while cutting off communication to the supply passage. In the third position, all valve modules in the bleed mode can be vented.

An external pressure gage 92 is secured to each valve module 12 and communicates through passage 95 with passage 65 to provide an indication of gas pressure in the gas spring or other device connected to the module through the fitting 66. The other end of passage 95 is closed and sealed by a threaded plug 97 and O-ring 99. If desired, to limit maximum pressure to a safe valve a rupture disc, relief valve, or the like can be installed in lieu of plug 97. If desired, the locations of plug 97 and fitting 66 can be switched to connect the gas spring to the back of the module rather than its bottom.

Figures 3, 4:
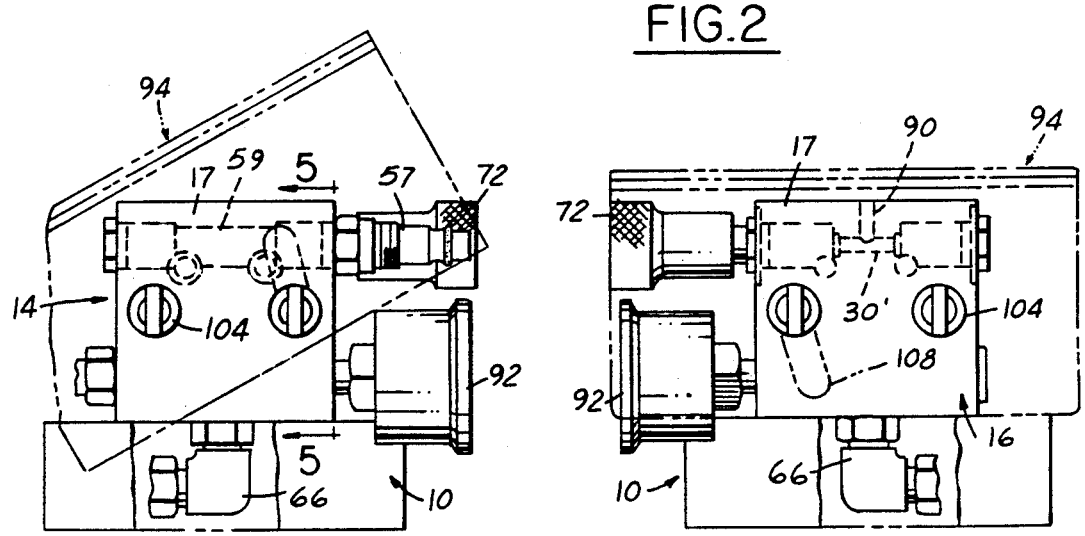
FIG. 3 is an end view looking in the direction of the arrow 3 in FIG. 2, showing the protective shield in phantom lines in raised position.
FIG. 4 is an end view looking in the direction of the arrow 4 in FIG. 2.

As shown in FIGS. 1-4, protective shield 94 protects the individual valve modules 12 and their external operating knobs 72 and gages 92 from damage. Shield 94 has two elongated plates 96 and 98 which overlap and are releasably secured together over the tops of the modules by fasteners 100. The plates each have a plurality of equally longitudinally spaced apart fastener-receiving holes 101 so that the length of the shield may be adjusted depending on the number of modules in the panel. The plates 96 and 98 have flanges 102 extending over the outer ends of the end-most modules 14 and 16 and pivoted thereto by pins 104 threaded into nuts 18 in holes 22 on the outside faces of modules 14 and 16. FIG. 3 shows the shield in its raised position and FIG. 4 shows the shield in its lowered position. Pins 104 threaded into nuts 18 in holes 23 on the outside faces of modules 14 and 16 extend through slots 108 in the flanges 102 to limit pivotal movement of the shield beyond the positions shown in FIGS. 3 and 4 and releasably secure it in any desired position.

In use, high pressure gas is supplied through inlet fitting 57 by the supply passage 60 to all of the valve modules 12. The valve mechanisms 67 regulate the amount of gas entering the valve chamber 30 of each valve module, independently of the other valve modules. The valve chamber 30 of each valve module may also be sealed off from both the supply and bleed passages or ported to the bleed passage, independently of the others. The knob indicator pin 76 for each valve module indicates the position of the valve mechanism 67 for its valve module. The valve mechanism 67 for the bleed module 16 can be set to simultaneously vent all the valve modules in the bleed mode. It can also exhaust the supply passage to insure that all gas in the panel is vented before a module is added to or removed from the panel.

What is claimed is:

1. A modular control valve panel, comprising a plurality of at least two separable valve modules arranged end-to-end, each said valve module having a valve chamber therein, a supply module at one end of said plurality of valve modules, a bleed module at the other end of said plurality of valve modules, a supply passage having an inlet in said supply module and leading from said supply module through said valve modules into said bleed module, a bleed passage extending through said plurality of valve modules into said bleed module, each valve module having valve means operable in a first mode to open its valve chamber to said supply passage while sealing it from said bleed passage, in a second mode to open its valve chamber to said bleed passage while sealing it from said supply passage, and in a third mode to seal its valve chamber from both said supply passage and said bleed passage, means for supplying fluid under pressure to said inlet of said supply passage, a bleed outlet in said bleed module, and valve means in said bleed module operable selectively to place said bleed outlet in communication with said supply passage while sealing it from said bleed passage, to place said bleed outlet in communication with said bleed passage while sealing it from said supply passage, and to isolate said bleed outlet from both said supply passage and said bleed passage.

2. The modular control valve panel defined in claim 1, wherein said modules have opposing faces, opposed faces of adjacent modules are in surface-to-surface contact, and means for sealing said supply and bleed passages at the interface between adjacent modules through which said passages extend.

3. The modular control valve panel defined in claim 1, wherein means are provided for releasably securing said modules together and enabling valve modules to be added to and removed from said control valve panel.

4. The modular control valve panel defined in claim 3, wherein said means for releasably securing said modules together comprises a nut associated with each module, said nuts being arranged in an axially spaced apart series, and means interconnecting said nuts comprising tie rods extending across the interface between adjacent modules and threadedly engaging adjacent nuts in the series.

5. The modular control valve panel defined in claim 4, wherein said modules have aligned through-passages in which said nuts and tie rods are located.

6. The modular control valve panel defined in claim 1, wherein each valve module has a gauge for registering the pressure in the valve chamber thereof.

7. The modular control valve panel defined in claim 1, wherein said valve means for each valve module includes a valve rod axially movable to first, second and third positions to place said valve means in said first, second and third modes, respectively, and indicator means for indicating the position of said valve rod.

8. The modular control valve panel defined in claim 7, wherein said valve rod has an operating handle, said indicator means comprises a pin parallel to said valve rod and axially slidably received in an axial passage in said handle, and means for retaining said pin from moving axially relative to said valve module.

9. The modular control valve panel defined in claim 8, including means rotatably connecting said handle to said valve rod for axial movement therewith, said handle threadedly engaging said valve module whereby rotation of said handle moves said handle and valve rod axially, and spring means on said handle urging said pin into abutting engagement with said valve module.

10. The modular control valve panel defined in claim 1, wherein said valve means for each valve module includes a valve rod axially movable to first, second and third positions to place said valve means in said first, second and third modes, respectively, said valve rod having a first spool controlling communication between said valve chamber and said supply passage and having a second spool controlling communication between said valve chamber and said bleed passage.

11. The modular control valve panel defined in claim 10, wherein said first and second spools are located in axially spaced apart relation on said valve rod and separated by a portion of said valve rod of reduced cross-section relative to said spools.

12. The modular control valve panel defined in claim 1, including a protective shield for said panel, and means mounting said protective shield on said panel for movement to raised and lowered positions.

13. The modular control valve panel defined in claim 12, wherein said protective shield comprises elongated plates releasably secured together in longitudinally adjusted position to extend from end to end of said modules, and said mounting means comprises pivot pins on said supply and bleed modules supporting said shield for pivotal movement between said raised and lowered positions.

14. The modular control valve panel defined in claim 13, wherein said valve means for each valve module is operated by an external handle, each valve module has an external gage for registering the pressure in the valve chamber thereof, said shield when in said lowered position protecting said valve modules including their external handles and gages from damage.

15. The modular control valve panel defined in claim 14, wherein means are provided for releasably securing said modules together and enabling valve modules to be added to and removed from said control panel, said releasable securing means comprising a series of nuts and tie rods arranged in through-passages in said modules, one said nut being associated with each module, and said tie rods extending across the interface between adjacent modules and threadedly engaging adjacent nuts, said pivot pins for said protective shield threadedly engaging the said nuts associated with said respective supply and bleed modules.

* * * * *